United States Patent Office 2,905,699
Patented Sept. 22, 1959

2,905,699

PROCESS FOR MAKING 2-ALKOXY- AND 2-ALKOXYALKOXY - 5,6 - DIHYDRO-1,2-PYRANS

Donald G. Kubler, South Charleston, W. Va., assignor to Union Carbide Corporation, a corporation of New York No Drawing. Application May 28, 1957
Serial No. 662,010

7 Claims. (Cl. 260—345.9)

This invention relates to a novel process for the preparation of 2-alkoxy-5,6-dihydro-1,2-pyrans, and more especially it concerns the production thereof by a process comprising the Diels-Alder condensation of a polymer of formaldehyde such as paraformaldehyde with a 1-alkoxy-1,3-alkadiene or 1-alkoxyalkoxy-1,3-alkadiene, as hereinafter more fully described.

Heretofore compounds of the 2-alkoxy-5,6-dihydro-1,2-pyran type have been made by a laborious polystep process which involved brominating 3,4-dihydro-1,2-pyran, reacting the resultant 2,3-dibromotetrahydropyran with an alcohol and ammonia to form the 2-alkoxy-3-bromo-tetrahydropyran, and reacting the latter with caustic soda.

The products made by the process of this invention are readily convertible to compounds of great utility. Thus, the compounds can be hydrolyzed and hydrogenated (either in one step or two steps) to yield 1,5-pentanediol and alkyl-substituted and alkoxyalkyl-substituted 1,5-pentanediols; or they can be hydrolyzed to form 2,4-pentadienal which is a readily polymerizable compound. The alkyl-substituted 1,5-pentanediols can be esterified with carboxylic acids such as octanoic acid, decanoic acid, succinic acid, glutaric acid, adipic acid, phthalic acid and the like in well known manner to produce esters useful as plasticizers for polyvinyl chloride resins and other vinyl resins. Thus, the Langley Patent 2,700,656 describes a typical esterification of alkyl-substituted 1,5-pentanediols, and plasticizer compositions derived therefrom.

This invention is based in important part upon the discovery that the presence of an alkoxy or alkoxyalkoxy radical on the carbon atom in the 1-position of a 1,3-alkadiene sufficiently activates the diene structure so that it reacts with paraformaldehyde in a Diels-Alder reaction. This is surprising, since a 1-alkoxy-1,3-butadiene would not react with 37% aqueous formalin.

An object of the invention is the production of 2-alkoxy-substituted and 2-alkoxyalkoxy-substituted-5,6-dihydro-1,2-pyrans by a novel process involving the use as reactant of a readily available relatively inexpensive paraformaldehyde and the production of such compounds under Diels-Alder reaction conditions while inhibiting polymerization of diene and reaction products.

These and other objects are attained by a process which comprises reacting paraformaldehyde and a 1-alkoxy- (or a 1-alkoxyalkoxy)-1,3-alkadiene, having four to ten carbon atoms in the diene basic structure, at elevated temperatures, in the presence of any of the well known polymerization inhibitors, such as hydroquinone, pyrogallol, guaiacol, naphthoquinone, the cresols, nitrophenol, p-N-butylaminophenol and the like. While the inhibitor can be used in amounts from 0.001 to 5% of the weight of the total reactants, preferably from 0.01 to 2% thereof are used.

The reaction can be conducted in the form of a batch process, or it can be conducted continuously by passing the paraformaldehyde in the form of a slurry with the alkoxyalkadiene, alone or in the presence of a suitable solvent, through a heated reaction zone, which may be a tube-type reactor heated to the proper temperature, the stream of reactants being moved therethrough at a rate providing the requisite residence time.

Reaction temperatures within the range from about 80° C. to about 250° C. can be used, but preferably temperatures from 100° C. to 200° C. are employed. While autogenous pressures commonly are used, higher pressures can be used by imposing an inert gas such as nitrogen, methane or carbon dioxide on the reaction zone. A trace amount of oxygen may be present and often may activate the polymerization inhibitors, but large amounts of oxygen are excluded.

The reaction can be conducted in the absence of a diluent, although inert solvents such as benzene, toluene, nonane and ethers such as diethyl ether, dioxane and tetrahydropyran can be used.

The reaction time varies in accordance with the reaction temperatures used and the starting diene used, but usually ranges around 4 to 6 hours when using a batch process. Molar ratios of alkoxydienes to paraformaldehyde of between abuot 1:10 and about 10:1 can be used, though preferably molar ratios ranging from 1:3 to 3:1 are used. Equimolar proportions of the two reactants are effectively used. The reaction mixture then is fractionally distilled under vacuum, and the 2-alkoxy-(or the 2-alkoxyalkoxy)-5,6-dihydro-1,2-pyran present therein is separately recovered from the distillate.

The principal reaction involved in the process is illustrated by the following equation:

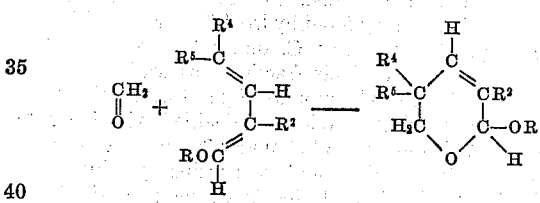

wherein R designates an alkyl or an alkoxyalkyl radical, and preferably alkyl radicals having from 1 to 10 carbon atoms and alkoxyalkyl radicals having 3 to 6 carbon atoms; and $R^2$, $R^4$, and $R^5$ respectively, designates a hydrogen or lower alkyl radical.

Among 1-alkoxy-(and 1-alkoxyalkoxy)-1,3-alkadienes useful as reactants in the process of the invention may be mentioned 1-methoxy-1,3-butadiene, 1-ethoxy-1,3-butadiene, 1-propoxy-1,3-butadiene, 1-isopropoxy-1,3-butadiene, 1-butoxy-1,3-butadiene, 1-isobutoxy-1,3-butadiene, 1-pentoxy-1,3-butadiene, 1-hexoxy-1,3-butadiene, 1-(2-ethylhexoxy)-1,3-butadiene, 1-(2-methoxyethoxy)-1,3-butadiene, 1-(2-ethoxyethoxy)-1,3-butadiene, 1-(2-butoxyethoxy)-1,3-butadiene, 1-methoxy-2-ethyl-1,3-butadiene, 1-ethoxy-2-ethyl-1,3-butadiene, 1-methoxy-1,3-pentadiene, 1-ethoxy-1,3-butadiene, 1-methoxy-1,3-hexadiene, 1-ethoxy-1,3-hexadiene, 1-methoxy-2-ethyl-1,3-hexadiene, 1-(2-ethoxyethoxy)-1,3-hexadiene, 1-methoxy-1,3-heptadiene, 1-ethoxy-1,3-heptadiene, 1-methoxy-1,3-octadiene, 1-ethoxy-1,3-octadiene, 1-ethoxy-4-ethyl-1,3-octadiene, 1-methoxy-1,3-nonadiene, 1-ethoxy-1,3-nonadiene, 1-methoxy-1,3-decadiene, 1-ethoxy-1,3-decadiene.

The 1,3-dienyl ether reactants are well known compounds and can be made by various processes, as by the dealcoholation of 1,1,3-trialkoxyalkanes, the latter of which can be made by the processes of U.S. Patents 2,564,760 and 2,564,761.

The following examples will serve to illustrate the invention.

Example 1

Into a stainless steel rocker bomb there were charged 504 grams (6 mols) of 1-methoxy-1,3-butadiene, 180 grams (6 mols) of paraformaldehyde, and 0.14 gram of a polymerization inhibitor being marketed under the trade name Du Pont "Antioxidant No. 5," the active ingredient of which is para-N-butylaminophenol. This mixture was heated at 180° C. for 4 hours with agitation. The resultant reaction mixture then was fractionally distilled under vacuum and 425 grams of 2-methoxy-5,6-dihydro-1,2-pyran was separately recovered as a fraction boiling over the range from 53 to 60° C. at 15 mm. of mercury pressure. This product was washed with water, and then fractionally distilled to yield a refined product boiling at 59–60° C. under 15 mm. mercury pressure, and having the following properties:

$n_D^{25}=1.4430$; specific gravity at 20/15.6° C.=1.008; the 2,4-dinitrophenylhydrazone M.P. was 168–169.5° C. It had the following analysis, in percent by weight:

|   | Calculated for $C_6H_{10}O_2$ | Found |
| --- | --- | --- |
| C | 63.13 | 63.1 |
| H | 8.84 | 9.2 |
| Unsaturation, meq./g. | 17.50 | 17.25 |

Example 2

Following the procedure described in Example 1, 588 grams (6 mols) of 1-ethoxy-1,3-butadiene, 180 grams (6 mols) of paraformaldehyde, and 2 grams of hydroquinone was heated at 180° C. for six hours, after which the reaction mixture was distilled under vacuum, and 430 grams of 2-ethoxy-5,6-dihydro-1,2-pyran, boiling over the range of 92° to 54° C. under 120 to 20 mm. pressure was recovered. This fraction was washed with water until free from small amounts of paraformaldehyde, and the washed product fractionally distilled, yielding a refined product distilling at 53° C. under 20 mm. mercury, and having $n_D^{20}=1.4432$; and a specific gravity at 20/15.6° C.=0.973. It had the following analysis, in percent by weight:

|   | Calculated for $C_7H_{12}O_2$ | Found |
| --- | --- | --- |
| C | 65.59 | 65.34 |
| H | 9.44 | 9.87 |
| Unsaturation, meq./g. | 15.60 | 15.43 |

2.67 mols of the said 2-ethoxy-5,6-dihydro-1,2-pyran was hydrogenated with hydrogen at 75° C. and under 150 lbs. per square inch pressure gauge, in the presence of a Raney nickel catalyst in a stainless steel autoclave with agitation. The resultant 2-ethoxytetrahydropyran, secured in 86% yield, distilled at 46–7° C. under 20 mm. mercury. It had $n_D^{20}=1.4247$; and a specific gravity at 20/15.6° C=0.938. These are substantially the same values secured from an authentic sample of 2-ethoxytetrahydropyran.

Example 3

6 mols (588 grams) of 1-ethoxy-1,3-butadiene, 4 mols (120 grams) of paraformaldehyde, and 2 grams of hydroquinone were heated for six hours at 180° C. in a stainless steel rocker bomb purged with nitrogen. The reaction mixture then was fractionally distilled under vacuum and the fraction boiling at 50–55° C. under 20 mm. Hg was collected. This fraction of 384 grams of 2-ethoxy-5,6-dihydro-1,2-pyran represents a 50% yield, based on 1-ethoxy-1,3-butadiene, and a 75% yield, based on paraformaldehyde.

Example 4

A mixture of 498 grams (4.45 mols) of 1-methoxy-1,3-hexadiene, 120 grams (4 mols) of paraformaldehyde, and 2 grams of pyrogallol was heated at 180° C. for four hours in a 3-liter stainless steel rocker bomb.

The resultant reaction mixture was fractionally distilled, and the fraction boiling at 56 to 74° C. under 25 mm. of mercury pressure was separately recovered, washed with water, and the washed distillate fractionally distilled under vacuum, yielding 118 grams of 2-methoxy-5-ethyl-5,6-dihydro-1,2-pyran, boiling at 69° C. under 20 mm. mercury pressure, and having $n_D^{20}=1.4466$; and a specific gravity at 20/15.6° C.=0.956. It had the following analysis, in percent by weight:

|   | Calculated for $C_8H_{14}O_2$ | Found |
| --- | --- | --- |
| C | 67.57 | 67.42 |
| H | 9.92 | 10.00 |
| Unsaturation, meq./g. (bromination) | 14.06 | 14.00 |
| Molecular refraction | 39.80 | 39.66 |

Example 5

A mixture of 0.87 mol of 1-methoxy-2-ethyl-1,3-butadiene, 0.92 mol (26.5 grams) of paraformaldehyde, and 5 drops of Du Pont "Antioxidant No. 5" as polymerization inhibitor was placed in a stainless steel rocker bomb, purged with nitrogen, and heated for four hours at 180° C. under autogenous pressure.

The resultant reaction mixture was fractionally distilled under vacuum, and the fraction boiling at 67°–69° C. under 20 mm. mercury pressure which was recovered was 3-ethyl-2-methoxy-5,6-dihydro-1,2-pyran, there being a 29% yield. This product had $n_D^{20}=1.4506$ and had the following analysis in percent by weight:

|   | Calculated for $C_8H_{14}O_2$ | Found |
| --- | --- | --- |
| C | 67.57 | 66.6 |
| H | 9.93 | 9.9 |
| Unsaturation, meq./g. | 14.06 | 13.78 |

Example 6

A stainless steel rocker bomb containing 1.46 mols (187 grams) of 1-(2-methoxyethoxy)-1,3-butadiene, 1.46 mols (44 grams) of paraformaldehyde, and 5 drops Du Pont "Antioxidant No. 5" was purged with nitrogen and then heated for four hours at 180° C.

The resultant reaction mixture was fractionally distilled under vacuum, and the 2-(2-methoxyethoxy)-5,6-dihydro-1,2-pyran present therein was recovered in 30% yield. This product, boiling at 74–75° C. under 5 mm. mercury, and having $n_D^{20}=1.4531$, had the following analysis, in percent by weight:

|   | Calculated for $C_8H_{14}O_3$ | Found |
| --- | --- | --- |
| C | 60.74 | 60.9 |
| H | 8.92 | 9.0 |
| Unsaturation, meq./g. | 12.64 | 12.62 |

Example 7

Following the general procedure described in Example 6, a mixture of 0.18 mol of 1-(2-ethylhexoxy)-1,3-butadiene, 0.18 mol (5.5 grams) of paraformaldehyde, and two drop of Du Pont "Antioxidant No. 5" was heated for four hours at 180° C. The reaction mixture was fractionally distilled under vacuum, thereby providing a 32% yield of 2-(2-ethylhexoxy)-5,6-dihydro-1,2-pyran. This product boiled at 93–94° C. under 2 mm. mercury pressure. It had a $n_D^{20}=1.4530$, and the following analysis, in percent by weight:

|   | Calculated for $C_{13}H_{24}O_2$ | Found |
|---|---|---|
| C | 73.54 | 73.0 |
| H | 11.39 | 11.4 |
| Unsaturation, meq./g | 9.42 | 9.33 |

By the practice of this invention it is possible to produce 2-alkoxy-5,6-dihydro-1,2-pyrans in good yields by a relatively simple process involving a single stage reaction.

The invention is susceptible of modification within the scope of the appended claims.

What is claimed is:

1. Process for the preparation of a 2-alkoxy-5,6-dihydro-1,2-pyran, which comprises reacting paraformaldehyde at elevated temperatures within the range from about 80° C. to 250° C. with a 1,3-dienyl ether having a structure represented by the formula:

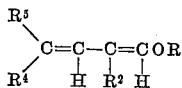

wherein R designates a member of the class consisting of the alkyl radicals having 1 to 10 carbon atoms and alkoxyalkyl radicals having 3 to 6 carbon atoms; and $R^2$, $R^4$ and $R^5$, respectively, designates a member of the class consisting of hydrogen and the lower alkyl radicals, in the presence of a polymerization inhibitor, and recovering a substituted pyran having the structure:

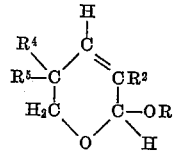

wherein R, $R^2$, $R^4$ and $R^5$ have the aforesaid designations.

2. Process as set forth in claim 1, wherein the 1,3-dienyl ether reactant is 1-methoxy-1,3-butadiene.

3. Process as set forth in claim 1, wherein the 1,3-dienyl ether reactant is 1-ethoxy-1,3-butadiene.

4. Process as set forth in claim 1, wherein the 1,3-dienyl ether reactant is 1-(2-ethylhexoxy)-1,3-butadiene.

5. Process as set forth in claim 1, wherein the 1,3-dienyl ether reactant is 1-(2-methoxyethoxy)-1,3-butadiene.

6. Process as set forth in claim 1, wherein the 1,3-dienyl compound reactant is 1-methoxy-2-ethyl-1,3-butadiene.

7. Process as set forth in claim 1, wherein the 1,3-dienyl compound reactant is 1-methoxy-1,3-hexadiene.

References Cited in the file of this patent

Gresham et al.: J. Am. Chem. Soc., vol. 73, pp. 5869–70 (1951).